(12) United States Patent
Wen et al.

(10) Patent No.: US 7,034,912 B2
(45) Date of Patent: Apr. 25, 2006

(54) TRANSFLECTIVE LCD DEVICE

(75) Inventors: Chi-Jain Wen, Hsinchu (TW);
Dai-Liang Ting, Hsinchu (TW);
Shyuan-Jeng Ho, Hsinchu (TW)

(73) Assignee: Toppoly Optoelectronics Corp.,
Chunan (TW)

( * ) Notice: Subject to any disclaimer, the term of this patent is extended or adjusted under 35 U.S.C. 154(b) by 0 days.

(21) Appl. No.: 10/461,344

(22) Filed: Jun. 16, 2003

(65) Prior Publication Data

US 2004/0252261 A1   Dec. 16, 2004

(51) Int. Cl.
*G02F 1/1343* (2006.01)
(52) U.S. Cl. .................................................. 349/141
(58) Field of Classification Search ......... 349/113–114
See application file for complete search history.

(56) References Cited

U.S. PATENT DOCUMENTS 6,570,634 B1 * 5/2003 Kim ........................... 349/107

2003/0112213 A1 * 6/2003 Noguchi et al. ............. 345/96

* cited by examiner

*Primary Examiner*—Dung T. Nguyen
(74) *Attorney, Agent, or Firm*—Liu & Liu

(57) ABSTRACT

This invention relates to a transflective LCD device using different common voltages in the transmissive and reflective regions to present the same gray scale performance on the transmissive and reflective regions. The liquid crystal display device includes a first substrate including a plurality of transmissive regions and a plurality of reflective regions; a transmissive electrode formed on said transmission electrode region; a reflective electrode formed on said reflective regions and connected electrically with said transmissive electrode; a second substrate including a plurality of first common electrodes and a plurality of second common electrodes, wherein said first common electrodes are formed over said transmissive regions, said second common electrodes are formed over said reflective regions, and said first common electrodes are not connected electrically with said second common electrodes; and a liquid crystal layer interposed between said first substrate and said second substrate.

8 Claims, 5 Drawing Sheets

TRANSFLECTIVE LCD DEVICE

BACKGROUND OF THE INVENTION

1. Field of the Invention

The invention relates to a transflective LCD device, more particularly to a transflective LCD device using different common voltages in the transmissive and reflective regions to present the same gray scale performance on the transmissive and reflective regions.

2. Description of the Prior Art

A color liquid crystal display (LCD) panel comprises two transparent substrates and a liquid crystal layer interposed therebetween. Normally, the commonly used liquid crystal of the TFT LCD device is TN (Twisted nematic) liquid crystal, which is nematic. The liquid crystal molecules are arranged with regularity in one-dimension. All the long axes of the clubbed liquid crystal molecules are correlatively arranged in parallel according to a specific direction. The nematic liquid crystal easily flows due to its low viscosity because this molecule easily flows along the direction of its long axis.

As the structure of liquid crystal molecule is anisotropic, the induced photo-electronic effect will differ according to its arranging direction. In other words, the photo-electronic properties of liquid crystal molecule such as the dielectric permittivity or the refractive constant are anisotropic, too. Thus, the different gray scales displayed on the LCD can be formed by using the above matters to change the intensity of the incident light. For example, the dielectric permittivity can be divided into two vectors: $\epsilon\|$ (in parallel with the long axis of liquid crystal molecule) and $\epsilon\perp$ (vertical to the long axis of liquid crystal molecule). If $\epsilon\|>\epsilon\perp$, the dielectric anisotropy of the liquid crystal is called as positive and If $\epsilon\|<\epsilon\perp$, the dielectric anisotropy of the liquid crystal is called as negative. When a voltage is applied on the liquid crystal molecule, which will rotate parallel to or vertical to the electric field due to the positive or negative value of the dielectric anisotropy for permitting the light rays to pass through the liquid crystal or not. Now, the dielectric anisotropy of the TN type liquid crystal used in the TFT-LCD is almost positive.

FIG. 1A shows the arrangement of the positive type liquid crystal that is not applied the voltage. Presently, the pixel electrode 12 and the common electrode 13 are not applied voltage or the voltage difference on the liquid crystal layer 11 is zero so that the liquid crystal molecules 14 are arranged parallel to each other. Thus, the light can passes through not only the transmissive region but also the reflective region so as to be displayed on the screen of LCD. On the contrary, when a voltage is applied to the liquid crystal layer 11, the liquid crystal molecules 14 begin to rotate and are not arranged parallel to each other. Then the liquid crystal molecules 14 will arrange vertically to the pixel electrode 12 and the common electrode 13 until the voltage achieves a specific value V1 as shown in FIG. 1B. Thus, the light cannot pass through not only the transmissive region but also the reflective region, so it cannot be displayed on the screen of LCD.

FIG. 2A shows a transmissive rate to applied voltage curve (T-V Curve) and a refractive rate to applied voltage curve (R-V Curve). As shown in FIG. 2A, we can understand that the transmissive rate or the refractive rate is decreased while the applied voltage is increased. Therefore, the intensity of incident light rays can be varied by means of the above properties in order to display different gray scales on the screen of LCD. The conventional transflective liquid crystal display device is described with reference to FIG. 2B. The pixel electrode comprises a transmissive electrode 21 and a reflective electrode 22 that are connected electrically each other. The common electrode 23 is a transparent conductive layer formed in the transmissive and reflective regions. When a voltage is applied to the pixel electrode and the common electrode, the external voltage applied in the transmissive region is the same as that in the reflective region. As the T-V curve does not overlap the R-V curve as shown in FIG. 2A, the measured transmissive rate and the reflective rate are different when a fixed applied voltage is provided. It causes the gray scale displayed in the transmissive region is different from the gray scale displayed in the reflective region. In other words, the gray scale displayed on the screen of LCD by interior light source through the transmissive region (transmissive mode) is different from the gray scale displayed on the screen of LCD by exterior light source through reflective region (reflective mode). For example, the LCD presents blue under transmissive mode, while the LCD presents pale blue under reflective mode. The users will query the quality of the product.

SUMMARY OF THE INVENTION

In the light of the state of the art described above, it is an object of the present invention to provide a transflective LCD device which is immune to the problems of the conventional transflective LCD device described above.

It is another object of this invention to provide a transflective LCD device using different common voltages in the transmissive and reflective regions to present the same gray scale performance on the transmissive and reflective regions.

In view of the above and other objects which will become apparent as the description proceeds, there is provided according to a general aspect of the present invention A liquid crystal display device which comprises a first substrate including a plurality of transmissive regions and a plurality of reflective regions; a transmissive electrode formed on at lest one of the said transmission regions; a reflective electrode formed on at least one of the said reflective regions and connected electrically with said transmissive electrode; a second substrate including a plurality of first common electrodes and a plurality of second common electrodes, wherein said first common electrodes are formed over said transmissive regions, said second common electrodes are formed over said reflective regions, and said first common electrodes are not connected electrically with said second common electrodes; and a liquid crystal layer interposed between said first substrate and said second substrate.

Based on the idea described above, wherein said first and second substrates are transparent.

Based on the aforementioned idea, wherein said transmissive electrode is a transparent conductive layer.

Based on the idea described above, wherein said transparent conductive layer is selected from the group consisting of ITO and IZO.

Based on the aforementioned idea, wherein said reflective electrode is a metal layer.

Based on the idea described above, wherein said metal layer is selected from the group consisting of Al, Ag, and AlNd.

Based on the idea described above, wherein said first and second common electrodes are transparent conductive layers.

Based on the aforementioned idea, wherein said transparent conductive layer is selected from the group consisting of ITO and IZO.

Based on the idea described above, wherein the distance between said first common electrode and said second substrate is equal to the distance between said second common electrode and said second substrate.

Based on the aforementioned idea, wherein the distance between said first common electrode and said second substrate is shorter than the distance between said second common electrode and said second substrate.

Based on the idea described above, wherein the distance between said first common electrode and said second substrate is longer than the distance between said second common electrode and said second substrate.

In view of the above and other objects which will become apparent as the description proceeds, there is provided according to a general aspect of the present invention A liquid crystal display device which comprises a first substrate including a plurality of transmissive regions and a plurality of reflective regions; a transmissive electrode formed on at least one of the said transmission regions; a reflective electrode formed on at least one of the said reflective regions and connected electrically with said transmissive electrode; a second substrate including a plurality of first common electrode regions and a plurality of second common electrode regions, wherein said first common electrode regions are formed over said transmissive regions, and said second common electrode regions are formed over said reflective regions; a first common electrode formed over said first and second common electrode regions; a second common electrode formed over said second common electrode regions and isolated from said first common electrode by a dielectric layer; and a liquid crystal layer interposed between said first substrate and said second substrate.

Based on the idea described above, wherein said first and second substrates are transparent.

Based on the aforementioned idea, wherein said transmissive electrode is a transparent conductive layer.

Based on the idea described above, wherein said transparent conductive layer is selected from the group consisting of ITO and IZO.

Based on the aforementioned idea, wherein said reflective electrode is a metal layer.

Based on the idea described above, wherein said metal layer is selected from the group consisting of Al, Ag, and AlNd.

Based on the idea described above, wherein said first and second common electrodes are transparent conductive layers.

Based on the aforementioned idea, wherein said transparent conductive layer is selected from the group consisting of ITO and IZO.

In view of the above and other objects which will become apparent as the description proceeds, there is provided according to a general aspect of the present invention A liquid crystal display device which comprises a first substrate including a plurality of transmissive regions and a plurality of reflective regions; a transmissive electrode formed on at least one of the said transmission regions; a reflective electrode formed on at least one of the said reflective regions and connected electrically with said transmissive electrode; a second substrate including a plurality of first common electrode regions and a plurality of second common electrode regions, wherein said first common electrode regions are formed over said transmissive regions, and said second common electrode regions are formed over said reflective regions; a first common electrode formed over said first and second common electrode regions; a second common electrode formed over said first common electrode regions and isolated from said first common electrode by a dielectric layer; and a liquid crystal layer interposed between said first substrate and said second substrate.

Based on the idea described above, wherein said first and second substrates are transparent.

Based on the aforementioned idea, wherein said transmissive electrode is a transparent conductive layer.

Based on the idea described above, wherein said transparent conductive layer is selected from the group consisting of ITO and IZO.

Based on the aforementioned idea, wherein said reflective electrode is a metal layer.

Based on the idea described above, wherein said metal layer is selected from the group consisting of Al, Ag, and AlNd.

Based on the idea described above, wherein said first and second common electrodes are transparent conductive layers.

Based on the aforementioned idea, wherein said transparent conductive layer is selected from the group consisting of ITO and IZO.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
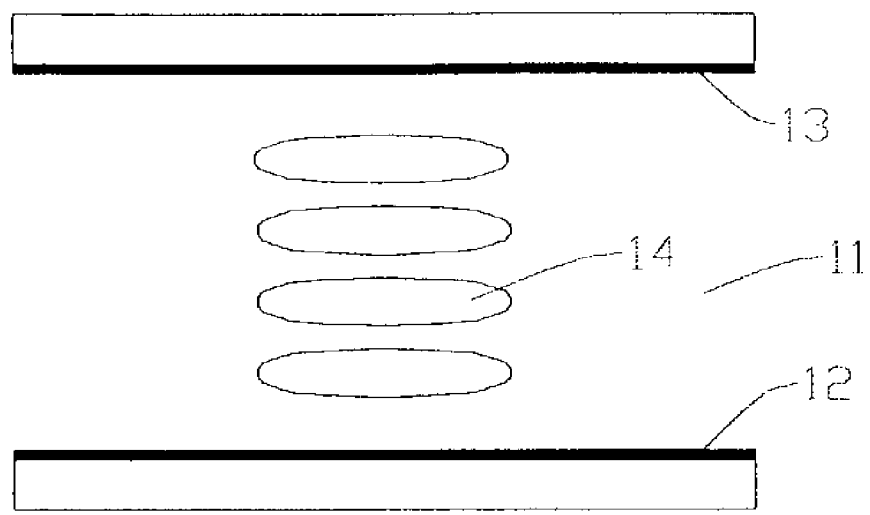
FIG. 1A shows the arrangement of positive type liquid crystal that is not applied the voltage.
Figure 1B:
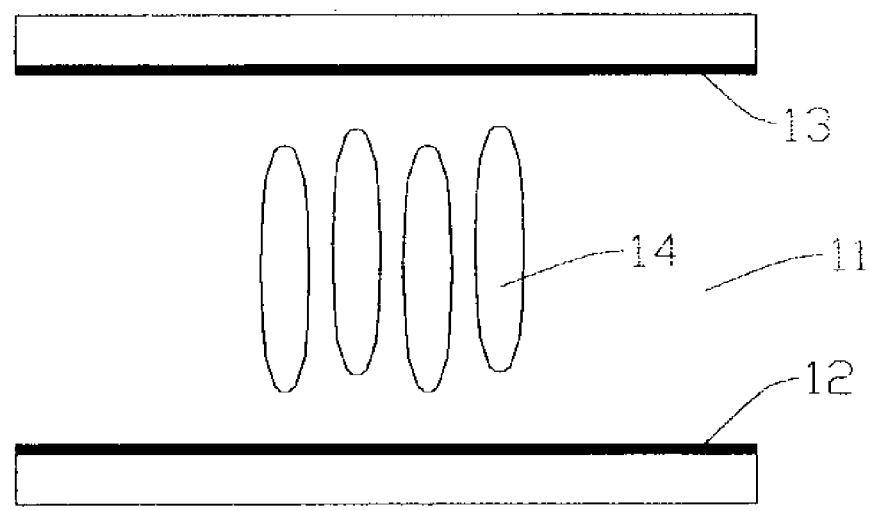
FIG. 1B shows the arrangement of positive type liquid crystal that is applied the voltage V1.
Figure 2A:
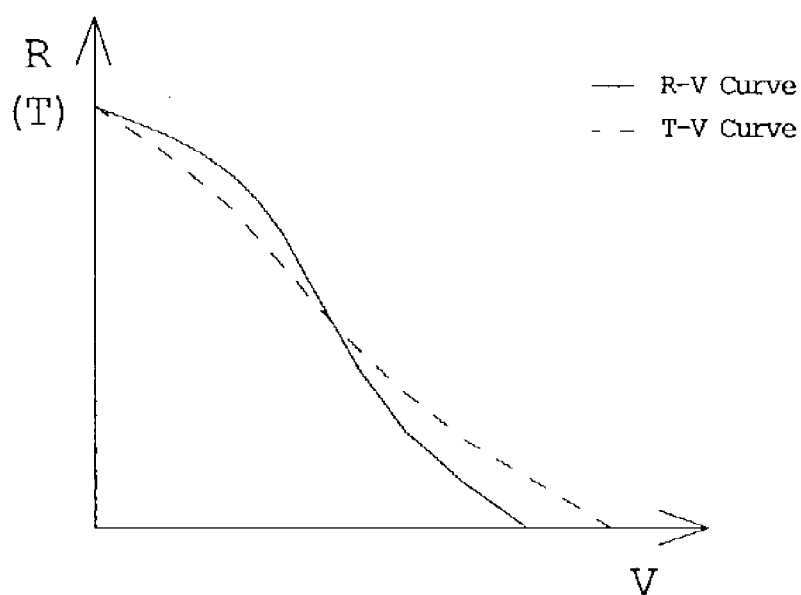
FIG. 2A shows the figure of transmissive and reflective rates of liquid crystal that is applied the voltage.
Figure 2B:
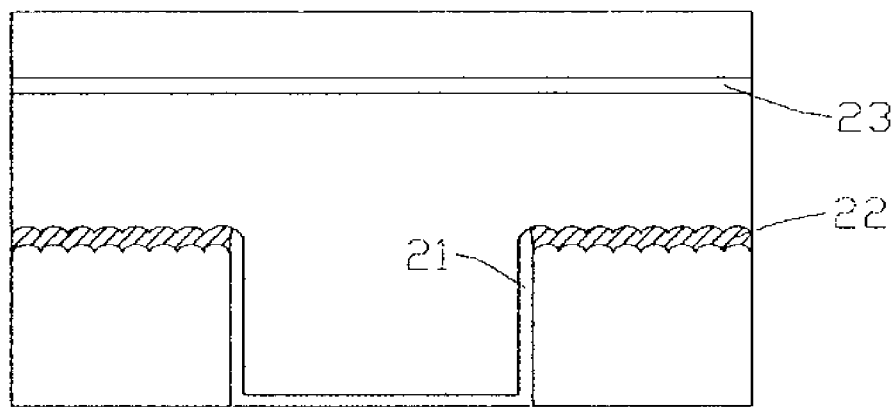
FIG. 2B schematically illustrates a cross-sectional view of conventional transflective liquid crystal display device.
Figure 3:
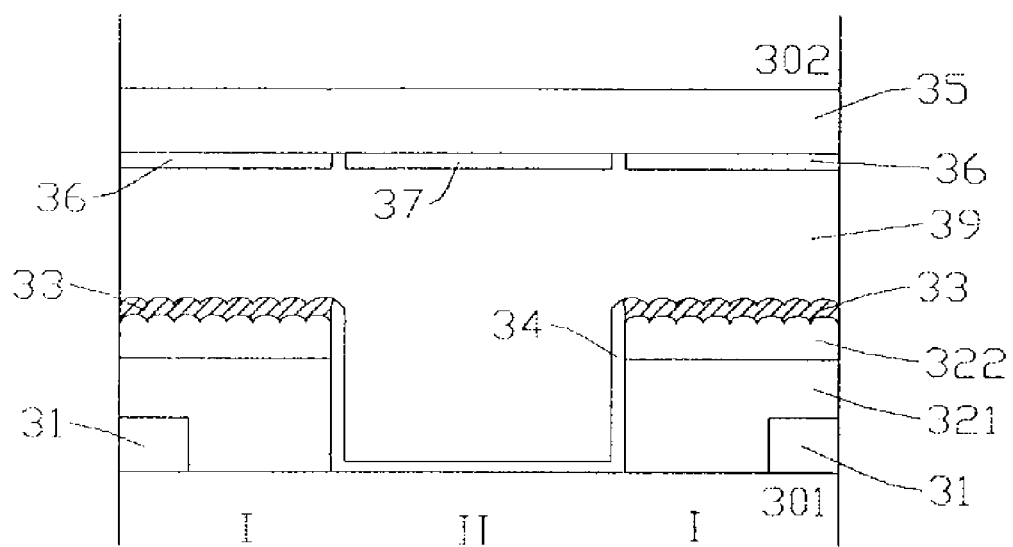
FIG. 3 schematically illustrates a cross-sectional view of transflective liquid crystal display device according to the first embodiment of the present invention.

Please refer to FIG. 3, a cross-sectional view of transflective liquid crystal display (LCD) device according to the first embodiment of the present invention is shown. Each pixel of the transflective LCD device can be divided into the transmissive region II and the reflective region I. The process of manufacturing the device will be described. First, a thin film transistor (TFT) 31 and a transparent dielectric layer 321 are sequentially formed on the transparent substrate 301. The transparent dielectric layer 321 can be a silicon oxide ($SiO_x$) layer, a silicon nitride ($SiN_x$) layer, or their stacked layers. Subsequently, a pad dielectric layer 322 with bumps is formed on the surface of reflective region I. The pad dielectric layer 322 can be photosensitive resin or other dielectric materials. When the material of pad dielectric layer 322 is photosensitive resin, it can be directly coated on the transparent substrate 301, then the transmissive region II and the reflective region I are patterned with the photolithography process. Then, the transmissive electrode 34 in the transmission electrode region II can be formed with ITO or IZO by the sputtering process. Similarly, the reflective electrode 33 in the reflection electrode region I can be formed with Al, Ag, or AlNd by the sputtering process. As mentioned above, the transmissive electrode 34 and the reflective electrode 33 are electrically connected each other for forming a pixel electrode. Besides, the pixel electrode is electrically connected with the TFT 31.

After the color filter 35 formed on the transparent substrate 302, a reflective common electrode 36 in the reflective region I and a transmissive common electrode 37 in the transmissive region II are formed. First, an ITO or IZO layer is coated on the color filter 35 with the sputtering process, and then the ITO or IZO layer are patterned and isolated by the photolithography and etching processes to form the reflective and transmissive common electrodes 36,37 that are not connected electrically each other. Finally, the transparent substrate 301 and the transparent substrate 302 are sealed with electrodes 33,34,36,37 face to face and vacuumed, and liquid crystal is injected into the space between the transparent substrate 301,302 to form a liquid crystal layer 39. Hence, we can apply the different voltages to the reflective common electrode 36 in the reflective region I and the transmissive common electrode 37 in the transmissive region II in order to achieve a perfect gray scale presented on the screen of transflective LCD device.

Figure 4:
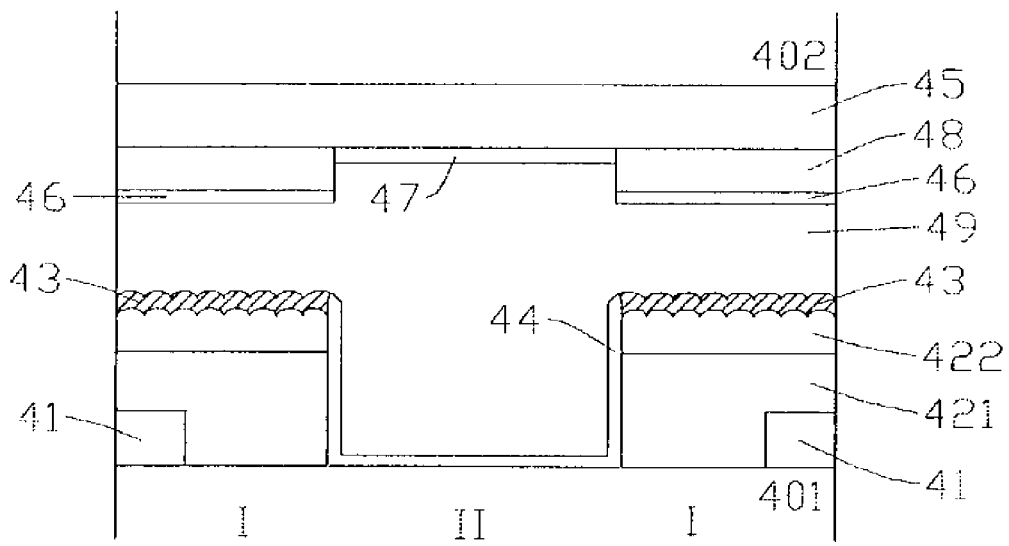
FIG. 4 schematically illustrates a cross-sectional view of transflective liquid crystal display device according to the second embodiment of the present invention.

Please refer to FIG. 4, a cross-sectional view of transflective liquid crystal display (LCD) device according to the second embodiment of the present invention is shown. Each pixel of the transflective LCD device can be divided into the transmissive region II and the reflective region I. The process of manufacturing the device will be described. First, a thin film transistor (TFT) 41 and a transparent dielectric layer 421 are sequentially formed on the transparent substrate 401. The transparent dielectric layer 421 can be a silicon oxide ($SiO_x$) layer, a silicon nitride ($SiN_x$) layer, or their stacked layers. Subsequently, a pad dielectric layer 422 with bumps is formed on the surface of reflective region I. The pad dielectric layer 422 can be photosensitive resin or other dielectric materials. When the material of pad dielectric layer 422 is photosensitive resin, it can be directly coated on the transparent substrate 401, then the transmissive region II and the reflective region I are patterned with the photolithography process. Then, the transmissive electrode 44 in the transmission electrode region II can be formed with ITO or IZO by the sputtering process. Similarly, the reflective electrode 43 in the reflection electrode region I can be formed with Al, Ag, or AlNd by the sputtering process. As mentioned above, the transmissive electrode 44 and the reflective electrode 43 are electrically connected each other for forming a pixel electrode. Besides, the pixel electrode is electrically connected with the TFT 41.

After the color filter 45 formed on the transparent substrate 402, a reflective common electrode 46 in the reflective region I and a transmissive common electrode 47 in the transmissive region II are formed. First, a transparent dielectric layer 48 is coated on the color filter 45 with the deposition process, and the transparent dielectric layer in the transmissive region II is removed by the photolithography and etching processes. Next, an ITO or IZO layer is coated with the sputtering process, and the ITO or IZO layer are patterned and isolated by the photolithography and etching processes to form the reflective and transmissive common electrodes 46,47 that are not connected electrically each other. Finally, the transparent substrate 401 and the transparent substrate 402 are sealed with electrodes 43,44,46,47 face to face and vacuumed, and liquid crystal is injected into the space between the transparent substrate 401,402 to form a liquid crystal layer 49. Hence, we can apply the different voltages to the reflective common electrode 46 on the reflective region I and the transmissive common electrode 47 on the transmissive region II in order to achieve a perfect gray scale presented on the screen of transflective LCD device.

Figure 5:
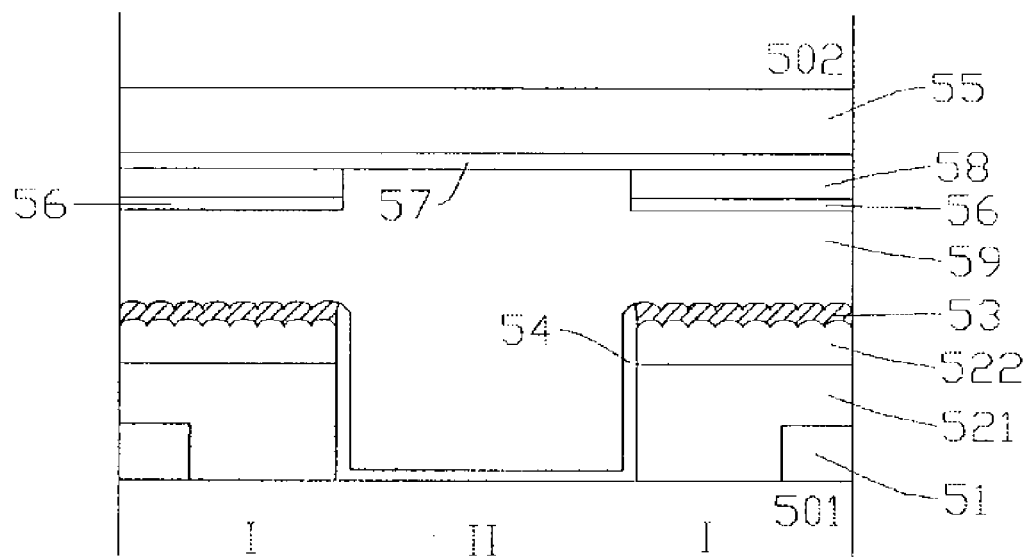
FIG. 5 schematically illustrates a cross-sectional view of transflective liquid crystal display device according to the third embodiment of the present invention.

Please refer to FIG. 5, a cross-sectional view of transflective liquid crystal display (LCD) device according to the third embodiment of the present invention is shown. Each pixel of the transflective LCD device can be divided into the transmissive region II and the reflective region I. The process of manufacturing the device will be described. First, a thin film transistor (TFT) 51 and a transparent dielectric layer 521 are sequentially formed on the transparent substrate 501. The transparent dielectric layer 521 can be a silicon oxide ($SiO_x$) layer, a silicon nitride ($SiN_x$) layer, or their stacked layers. Subsequently, a pad dielectric layer 522 with bumps is formed on the surface of reflective region I. The pad dielectric layer 522 can be photosensitive resin or other dielectric materials. When the material of pad dielectric layer 522 is photosensitive resin, it can be directly coated on the transparent substrate 501, then the transmissive region II and the reflective region I are patterned with the photolithography process. Then, the transmissive electrode 54 in the transmission electrode region II can be formed with ITO or IZO by the sputtering process. Similarly, the reflective electrode 53 in the reflection electrode region I can be formed with Al, Ag, or AlNd by the sputtering process. As mentioned above, the transmissive electrode 54 and the reflective electrode 53 are electrically connected each other for forming a pixel electrode. Besides, the pixel electrode is electrically connected with the TFT 51.

After the color filter 55 formed on the transparent substrate 502, a reflective common electrode 56 in the reflective region I and a transmissive common electrode 57 in the transmissive region II are formed. First, an ITO or IZO layer is coated on the color filter 55 with the sputtering process, a transparent dielectric layer 58 is coated on the ITO or IZO layer with the deposition process, and the transparent dielectric layer in the transmissive region II is removed by the photolithography and etching processes. Next, another ITO or IZO layer is coated with the sputtering process, and the ITO or IZO layer are patterned and isolated by the photolithography and etching processes to form the reflective and transmissive common electrodes 56,57 that are not connected electrically each other. Finally, the transparent substrate 501 and the transparent substrate 502 are sealed with electrodes 53,54,56,57 face to face and vacuumed, and liquid crystal is injected into the space between the transparent substrate 501,502 to form a liquid crystal layer 59. Hence, we can apply the different voltages to the reflective common electrode 56 on the reflective region I and the transmissive common electrode 57 on the transmissive region II in order to achieve a perfect gray scale presented on the screen of transflective LCD device.

Figure 6:
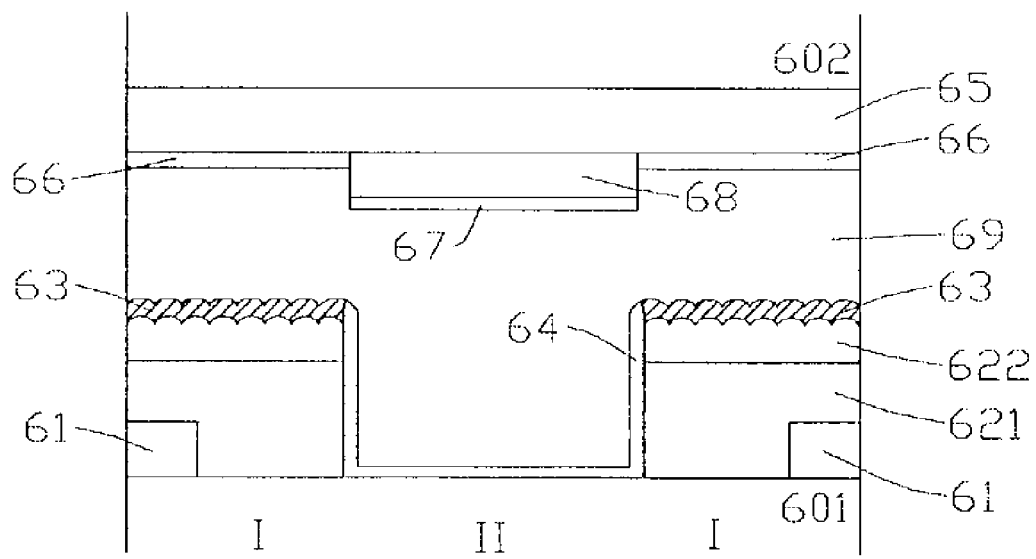
FIG. 6 schematically illustrates a cross-sectional view of transflective liquid crystal display device according to the fourth embodiment of the present invention.

Please refer to FIG. 6, a cross-sectional view of transflective liquid crystal display (LCD) device according to the fourth embodiment of the present invention is shown. Each pixel of the transflective LCD device can be divided into the transmissive region II and the reflective region I. The process of manufacturing the device will be described. First, a thin film transistor (TFT) 61 and a transparent dielectric layer 621 are sequentially formed on the transparent substrate 601. The transparent dielectric layer 621 can be a silicon oxide ($SiO_x$) layer, a silicon nitride ($SiN_x$) layer, or their stacked layers. Subsequently, a pad dielectric layer 622 with bumps is formed on the surface of reflective region I. The pad dielectric layer 622 can be photosensitive resin or other dielectric materials. When the material of pad dielectric layer 622 is photosensitive resin, it can be directly coated on the transparent substrate 601, then the transmissive region II and the reflective region I are patterned with the photolithography process. Then, the transmissive electrode 64 in the transmission electrode region II can be formed with ITO or IZO by the sputtering process. Similarly, the reflective electrode 63 in the reflection electrode region I can be formed with Al, Ag, or AlNd by the sputtering process. As mentioned above, the transmissive electrode 64 and the reflective electrode 63 are electrically connected each other for forming a pixel electrode. Besides, the pixel electrode is electrically connected with the TFT 61.

After the color filter 65 formed on the transparent substrate 602, a reflective common electrode 66 in the reflective region I and a transmissive common electrode 67 in the transmissive region II are formed. First, a transparent dielectric layer 68 is coated on the color filter 65 with the deposition process, and the transparent dielectric layer in the reflective region I is removed by the photolithography and etching processes. Next, an ITO or IZO layer is coated with the sputtering process, and the ITO or IZO layer are patterned and isolated by the photolithography and etching processes to form the reflective and transmissive common electrodes 66,67 that are not connected electrically each other. Finally, the transparent substrate 601 and the transparent substrate 602 are sealed with electrodes 63,64,66,67 face to face and vacuumed, and liquid crystal is injected into the space between the transparent substrate 601,602 to form a liquid crystal layer 69. Hence, we can apply the different voltages to the reflective common electrode 66 on the reflective region I and the transmissive common electrode 67 on the transmissive region II in order to achieve a perfect gray scale presented on the screen of transflective LCD device.

Figure 7:
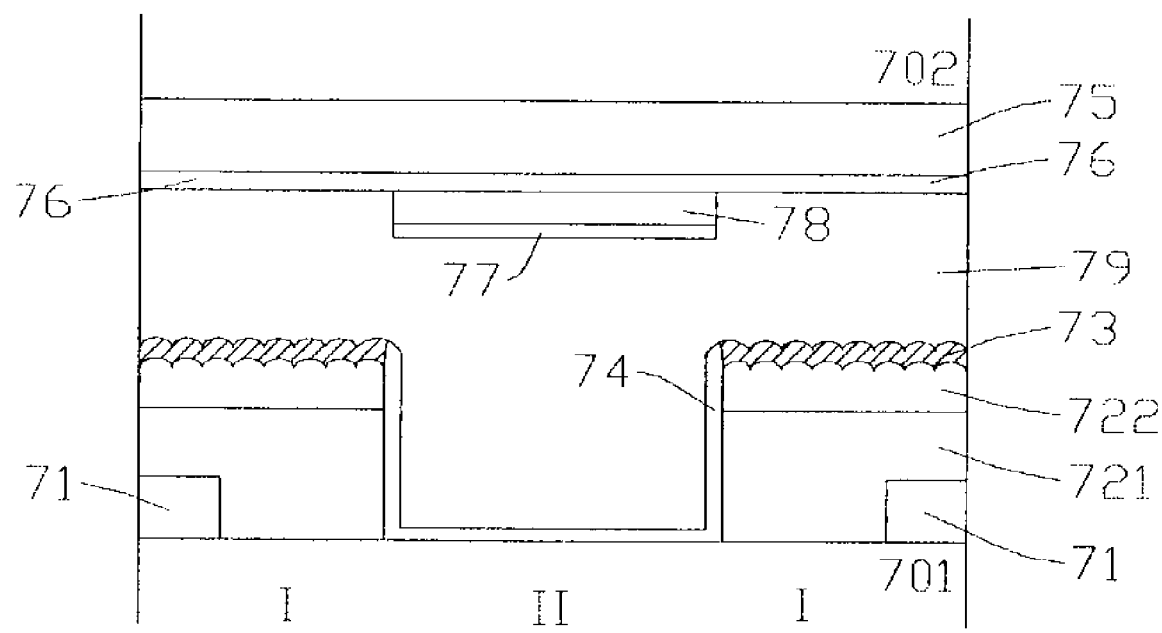
FIG. 7 schematically illustrates a cross-sectional view of transflective liquid crystal display device according to the fifth embodiment of the present invention.

Please refer to FIG. 7, a cross-sectional view of transflective liquid crystal display (LCD) device according to the fifth embodiment of the present invention is shown. Each pixel of the transflective LCD device can be divided into the transmissive region II and the reflective region I. The process of manufacturing the device will be described. First, a thin film transistor (TFT) 71 and a transparent dielectric layer 721 are sequentially formed on the transparent substrate 701. The transparent dielectric layer 721 can be a silicon oxide ($SiO_x$) layer, a silicon nitride ($SiN_x$) layer, or their stacked layers. Subsequently, a pad dielectric layer 722 with bumps is formed on the surface of reflective region I. The pad dielectric layer 722 can be photosensitive resin or other dielectric materials. When the material of pad dielectric layer 722 is photosensitive resin, it can be directly coated on the transparent substrate 701, then the transmissive region II and the reflective region I are patterned with the photolithography process. Then, the transmissive electrode 74 in the transmission electrode region II can be formed with ITO or IZO by the sputtering process. Similarly, the reflective electrode 73 in the reflection electrode region I can be formed with Al, Ag, or AlNd by the sputtering process. As mentioned above, the transmissive electrode 74 and the reflective electrode 73 are electrically connected each other for forming a pixel electrode. Besides, the pixel electrode is electrically connected with the TFT 71.

After the color filter 75 formed on the transparent substrate 702, a reflective common electrode 76 in the reflective region I and a transmissive common electrode 77 in the transmissive region II are formed. First, an ITO or IZO layer is coated on the color filter 75 with the sputtering process, a transparent dielectric layer 78 is coated on the ITO or IZO layer with the deposition process, and the transparent dielectric layer in the reflective region I is removed by the photolithography and etching processes. Next, another ITO or IZO layer is coated with the sputtering process, and the ITO or IZO layer are patterned and isolated by the photolithography and etching processes to form the reflective and transmissive common electrodes 76,77 that are not connected electrically each other. Finally, the transparent substrate 701 and the transparent substrate 702 are sealed with electrodes 73,74,76,77 face to face and vacuumed, and liquid crystal is injected into the space between the transparent substrate 701,702 to form a liquid crystal layer 79. Hence, we can apply the different voltages to the reflective common electrode 76 on the reflective region I and the transmissive common electrode 77 on the transmissive region II in order to achieve a perfect gray scale presented on the screen of transflective LCD device.

Although the specific embodiment has been illustrated and described, it will be obvious to those skilled in the art that various modifications may be made without departing from what is intended to be limited solely by the appended claims.

What is claimed is:
1. A liquid crystal display device, comprising:
a first substrate including a plurality of transmissive regions and a plurality of reflective regions;
a transmissive electrode formed on at least one of the said transmission regions;
a reflective electrode formed on at least one of the said reflective regions and connected electrically with said transmissive electrode;
a second substrate including a plurality of first common electrode regions and a plurality of second common electrode regions, wherein said first common electrode regions are formed over said transmissive regions, and said second common electrode regions are formed over said reflective regions;
a first common electrode formed over said first and second common electrode regions;
a second common electrode formed over said second common electrode regions and isolated from said first common electrode by a dielectric layer; and
a liquid crystal layer interposed between said first substrate and said second substrate.

2. The liquid crystal display device according to claim 1, wherein said first and second substrates are transparent.

3. The liquid crystal display device according to claim 1, wherein said transmissive electrode is a transparent conductive layer.

4. The liquid crystal display device according to claim 3, wherein said transparent conductive layer is selected from the group consisting of ITO and IZO.

5. The liquid crystal display device according to claim 1, wherein said reflective electrode is a metal layer.

6. The liquid crystal display device according to claim 5, wherein said metal layer is selected from the group consisting of Al, Ag, and AlNd.

7. The liquid crystal display device according to claim 1, wherein said first and second common electrodes are transparent conductive layers.

8. The liquid crystal display device according to claim 7, wherein said transparent conductive layer is selected from the group consisting of ITO and IZO.

* * * * *